United States Patent [19]

McReynolds

[11] Patent Number: 4,937,145
[45] Date of Patent: Jun. 26, 1990

[54] COMPOSITE PAPER REINFORCED THERMOPLASTIC SHEET

[75] Inventor: Kent B. McReynolds, Midland, Mich.

[73] Assignee: The Dow Chemical Company, Midland, Mich.

[21] Appl. No.: 273,546

[22] Filed: Nov. 21, 1988

[51] Int. Cl.$^5$ .................... B32B 27/36; D21H 5/18
[52] U.S. Cl. .................................. 428/412; 428/286; 428/290; 428/512; 428/514; 428/408; 428/325; 428/479.6; 162/156
[58] Field of Search ............... 428/412, 514, 512, 286, 428/290

[56] References Cited

U.S. PATENT DOCUMENTS 4,225,383  9/1980  McReynolds ................. 162/156

FOREIGN PATENT DOCUMENTS 0092560  6/1983  Japan ............................. 428/290
1019883  1/1986  Japan ............................. 428/290

*Primary Examiner*—P. C. Ives
*Attorney, Agent, or Firm*—Douglas N. Deline

[57] ABSTRACT

A three layer structural sheet material having improved resistance to delamination comprising a core layer of a composite paper having outer surface layers of thermoplastic resin adhered to both major surfaces thereof.

3 Claims, No Drawings

COMPOSITE PAPER REINFORCED THERMOPLASTIC SHEET

BACKGROUND OF THE INVENTION

The present invention relates to a thermoplastic sheet material reinforced with a composite layer. The composite layer comprises the central reinforcing core of a three layer composite structure. The outer layers comprise a thermoplastic resin adhered to the core layer. The structural sheet material may be used in construction and manufacturing to provide a flat rigid outer surface for various appliances or vehicles and may be thermoformed into a variety of shaped articles.

In U.S. Pat. No. 4,044,188 there is disclosed a stampable thermoplastic sheet material reinforced with a central core of a multi-length fiberglass mat. A highly loaded thermoplastic resin also containing short reinforcing fibers in the form of sheet materials is laminated to both major surfaces of a glass mat or its equivalent to fuse and laminate the two sheets and the glass fiber web or mat into an integral sheet construction. Disadvantageously, the previously known structural sheet materials disclosed in the foregoing patent have been found to possess undesirable features. In particular, in applications involving thermocycling wherein the structural sheet material is repeatedly exposed to extreme low temperatures followed by heating to elevated temperatures, the highly expandable thermoplastic layers exert sufficient stress that failure of the central core layer is often the result. It might be thought possible to control the thermal expansion characteristics of the thermoplastic resin by including reinforcing fibers in the resin, but this approach has not proven effective in practice. In addition the presence of fibers in the resin layer may generate undesired surface asthetics.

An additional problem associated with structures of the prior art is the tendency of the resin to migrate into the glass mat under molding conditions thereby producing an undesirable surface appearance. To overcome this result various fillers may be included into the resin in order to increase the melt viscosity thereof. Disadvantageously the addition of such fillers can adversely affect the physical properties of the thermoplastic layer particularly the impact strength thereof. Also this procedure does not solve the fundamental problem of glass mat layer failure.

Composite papers are previously known in the art. A suitable technique for their preparation has been disclosed and claimed in U.S. Pat. No. 4,225,383. One commercial use for composite paper is as the backing layer of vinyl flooring materials. In these materials one surface of the composite paper is laminated to a polyvinylchloride resin layer.

It would be desirable if there were provided an improved structural sheet material having improved resistance to failure due to thermal cycling and having improved dimensional stability without the use of reinforcing fillers or fibers.

SUMMARY OF THE INVENTION

According to the present invention there is now provided a three layer structural sheet material comprising a central core layer comprising a composite paper having two major surfaces, and two outer surface layers adhered to both major surfaces of the central core layer, said outer surface layers each comprising a thermoplastic resin that is devoid of reinforcing fibrous or filler material; provided further that the ratio of the linear coefficient of thermal expansion of one surface layer thermoplastic resin divided by the linear coefficient of thermal expansion of the other surface layer thermoplastic resin is in the range of 0.95 to 1.05; and the composite paper has a density from 20 to 250 lbs/ft$^3$ (320 kg/m$^3$ to 4000 kg/m$^3$), a tensile strength at room temperature of at least 200 lbs/in$^2$ (9.58 kPa), a resistance to delamination of 0.57 lbs/in (100 N/m) or greater, and a Tabor Stiffness (regular) of from 20 to 250.

DETAILED DESCRIPTION OF THE INVENTION

The term "composite paper" as used herein refers to a sheet material containing a water dispersible fiber, a film forming water insoluble organic polymer, and optionally, a non-fibrous organic or inorganic filler. A sheet is prepared by providing an aqueous dispersion of the components, colloidally destabilizing the resulting mixture to form a fibrous agglomerate in aqueous suspension, distributing and draining the aqueous suspension to form a wet web and thereafter drying the web. Suitable fibrous materials include any natural or synthetic water dispersible fiber or blend of such fibers. Water dispersibility may be provided by a small amount an anionic or hydrophylic group added to such fibers to make them water dispersible. Examples of suitable fibers include natural materials such as wool pulp, linen, or cotton fibers. Glass fibers, synthetic polymeric fibers such as polyethylene, polyester, nylon, etc. may also be employed. Preferred are a mixture of glass fibers with a small amount, up to 10% by weight, of cellulosic fibers. A suitable technique for preparing composite papers is disclosed in previously mentioned U.S. Pat. No. 4,225,383 the teachings of which are incorporated herein in their entirety by reference.

Suitable film forming water insoluble organic polymers include latexes of natural and synthetic rubbery polymeric materials such as natural rubber or polymers of conjugated dienes such as butadiene or isoprene optionally with additional comonomers such as styrene or acrylonitrile; butyl rubbers, etc.

The non-fibrous fillers include inorganic materials such as talc, calcium carbonate, clay, fumed silica, conductive fillers such as metal filings, conductive carbons, etc., and organic materials such as particulated resins including thermosetting or thermoplastic resins. The previously mentioned fillers also encompass colorants and pigments.

The resistance to delamination of the composite paper core provides the necessary internal strength to resist separation of the invented structure upon generation of heat cycling induced stresses. Delamination strength is measured by 180° pull testing using an Ingstrom TM or similar testing machine. Preferred are structures wherein the composite paper core has a resistance to delamination of at least 0.67 lbs/in (117 N/m). Improved resistance to structural failure of the central core layer and resistance to delamination is generally observed utilizing composite papers having higher densities.

In a preferred embodiment the composition paper has a density of from 40 to 120 lbs/ft$^3$ (640 kg/m$^3$ to 1920 kg/m$^3$), most preferably 45 to 100 lbs/ft$^3$ (720 kg/m$^3$ to 1600 kg/m$^3$).

The thermoplastic resins employed in the preparation of the outer surface layers suitably comprise any thermoplastic resin which may be adhered to the composite sheet core layer. Examples include the well known styrenic resins such as polystyrene and rubber modified polystyrene, styrene acrylonitrile copolymers, rubber modified styrene acrylonitrile copolymers such as ABS, AES, ASA; polyvinylchloride, nylon, polycarbonate, as well as blends of the foregoing. In addition to the thermosplatic resin, conventional additives and adjuvants may be included such as plasticizers, colorants, pigments, antioxidants, etc.

The thermoplastic layers may be adhered to the central core layer by use of an adhesive layer which may be either a thermoplastic melt extrudable adhesive resin or a conventional aqueous or a solvent dispersed adhesive resin. Preferably, however, the thermoplastic layers are merely adhered to the central reinforcing layer by contacting the same while in a molten or semi-molten state. This latter technique is referred to herein as heat lamination. In an alternative embodiment a single thermoplastic resin layer is heat laminated to one surface of a composite paper sheet and thereafter two such similarly prepared sheets are adhesively joined at the composite paper interface.

A desirable method of continuously producing the composite structural sheet material of the present invention is by the continuous extrusion/lamination method. Using such a method, two piles of thermoplastic sheeting are prepared by extrusion or other suitable method. The composite paper is then fed between the two plies and a proper combination of heat and pressure (supplied by laminating rolls or the like) is then used to fuse and laminate the two sheets and the central composite paper core into an integral sheet construction. The above technique is the same as is employed in the preparation of the thermoplastic sheet material disclosed in U.S. Pat. No. 4,044,188, and the teachings therein are incorporated herein in their entirety by reference. The various layers of the composite structural sheet material may vary in thickness in order to provide desired properties. Generally, each outer thermoplastic layer may be from about 0.1 mm to about 5 mm in thickenss, preferably from about 0.5 to about 1 mm in thickness. The composite paper layer generally is from about 0.1 to 2 mm for a single thickness, preferably from about 0.2 to 1 mm in thickness. If two such composite layers are adhesively joined as above explained the resulting laminate may have a composite layer thickness twice as large as above.

In one embodiment of the invention, the thermoplastic resins desirably comprise weatherable impact resistance polymers such as polyvinyl chloride or rubber modified copolymers of styrene and acrylonitrile wherein the rubber comprises and EPDM or acrylate rubber. It is not necessary that both resin layers be identical, however generally the least amount of bending forces are placed on the composite structure during thermal cycling where both resins are at least within the above identified ratio of linear coefficients of thermal expansion.

Having described the invention, the following examples are provided as further illustrative thereof and are not to be construed as limiting.

EXAMPLE 1

A sheet 0.03 inches (0.76 mm) thick of EPDM modified styrene acrylonitrile resin available from The Dow Chemical Company under the trademark Rovel TM 401, was laminated on both sides of a composite paper also 0.03 inches (0.76 mm) in thickness. The composite paper was obtained from Congoleum Inc. and is available under the tradename Whiteshield II TM. The composition of the composite paper was 75% talc, 15% styrene butadiene latex, 7% cellulose, and 3% 1/8" (3 mm) DE glass. The composite paper had a density of 1040 kg/m$^3$, a tensile strength at room temperature of 71.85 kPa and a Tabor Stiffness (regular) of 160. The thermoplastic sheets were laminated to both sides of the composite paper using a temperature of 300° F. (150° C.), a pressure of 1,000 lbs. sq. ft. (47.90 kPa) for a time of 5 minutes. The final structural laminate had a thickness of 0.093 inches (2.4 mm). When exposed to thermocycling for 24 cycles between −40° C. and +71° C. the laminate did not show any signs of delamination and showed no loss of physical properties compared to samples not exposed to thermal cycling.

EXAMPLE 2

A structural sheet material was prepared by adhering the thermoplastic sheet materials and composite paper materials previously described in Example 1 by the use of an urethane adhesive. The adhesive formulation was a two component formulation. One component comprised 82.35 weight percent of an acrylate modified polyol available from The Dow Chemical Company (XUS-16503), 9.9 weight percent propylene glycol, 7.5 weight percent of an amine terminated polyether triol of 440 molecular weight (Jeffamine T-403 available from Texico Inc.) and 0.25 weight percent of triethylene diamine as a 33 percent solution in dipropylene glycol (Dabco 33LV available from Air Products). The isocyanate component comprised 63 weight percent Isomate® 181 (available from The Dow Chemical Company) and 37 weight percent isocyanate XAS 10971.05, available from The Dow Chemical Company. The isocyanate side and polyol side were combined and mixed in a ratio of 1 to 1 by volume. The adhesive was applied to both the thermoplastic resin sheets (Rovel TM 401) and composite paper. The laminate was pressed (47.9 kPa, 30 sec) and cured for 24 hours at room temperature.

When tested under heat cycling conditions as in Example 1, the structural sheet material did not show any evidence of delamination.

EXAMPLE 3

A structural sheet material was prepared utilizing the technique of Example 1 excepting that the thermoplastic resin was polycarbonate in the form of a sheet material having a thickness of 2 mm. The three layer structural sheet material was prepared by compression lamination at 350° F. (177° C.)

When tested according to the technique of Example 1, no evidence of delamination was observed.

EXAMPLE 4

A structural sheet material was prepared according to the techniques of Example 1 excepting that the thermoplastic resin employed was an ABS resin (XU74050.00 available from The Dow Chemical Company). The laminate was prepared by compression lamination at a temperature of 150° C., a pressure of 1,000 lbs per sq. ft. (47.9 kPa), and a compression time of 1 hour.

When testing according to the technique of Example 1, no evidence of delamination was observed.

What is claimed is:

1. A three layer structural sheet material comprising a central core layer comprising a composite paper having two major surfaces, and two outer surface layers adhered to both major surfaces of the central core layer, said outer surface each comprising a thermoplastic resin and devoid of reinforcing fibrous or filler material; provided further that the ratio of the linear coefficient of thermal expansion of one surface layer thermoplastic resin divided by the linear coefficient of thermal expansion of the other surface layer thermoplastic resin is in the range of 0.95 to 1.05; and the composite paper has a density from 20 to 250 lbs/ft$^3$, a tensile strength at room temperature of at least 200 lbs/in$^2$, a resistance to delamination of at least 0.57 lbs/in, and a Tabor Stiffness of from 20 to 250.

2. A structural sheet material according to claim 1 wherein the thermoplastic resin is selected from the group consisting of homopolymers of styrene, rubber modified homopolymers of styrene, copolymers of styrene and acrylonitrile, polymethyl methacrylate, polycarbonate, polyvinylchloride, and blends thereof.

3. A structural sheet material according to claim 1 wherein both outer surface layers comprise the same thermoplastic resin.

* * * * *